United States Patent [19]

Culver et al.

[11] 4,047,447
[45] Sept. 13, 1977

[54] DUAL RATE BIAS SPRING FOR ANTIBACKLASHING GEARS

[75] Inventors: Irven H. Culver, Playa Del Rey; Oleg Szymber, Rancho Palos Verdes, both of Calif.

[73] Assignee: Belrico, Inc., San Lorenzo, P.R.

[21] Appl. No.: 678,316

[22] Filed: Apr. 19, 1976

Related U.S. Application Data

[63] Continuation-in-part of Ser. No. 576,883, May 12, 1975, abandoned.

[51] Int. Cl.$^2$ .................... F16H 55/18; F16H 57/00
[52] U.S. Cl. ........................................ 74/409; 74/410; 74/411
[58] Field of Search .................. 74/411, 409, 410

[56] References Cited

U.S. PATENT DOCUMENTS

| | | | |
|---|---|---|---|
| 3,370,478 | 2/1968 | Martin | 74/409 X |
| 3,889,549 | 6/1975 | Fieuzal et al. | 74/409 |
| 3,927,575 | 12/1975 | Durand | 74/411 |

*Primary Examiner*—Leonard H. Gerin
*Attorney, Agent, or Firm*—Christie, Parker & Hale

[57] ABSTRACT

An improved mechanism is provided for biasing a driven gear in a gear train of the variable center distance type in which the driven gear is meshed with a drive gear and rotates about an axis which is not fixed, at least radially, relative to the axis of the drive gear. The biasing mechanism includes spring means engaged with the driven gear for biasing the same substantially radially toward the driven gear into mesh therewith at a force which provides appropriate relatively low-level engagement forces between the meshed gear teeth. A stop is provided for limiting deflection of the spring means in a direction corresponding to unmeshing of the drive and driven gears. The stop is positioned to limit such deflection of the spring means to an amount less than the deflection required for unmeshing of the gears. The mechanism has first and second spring rates defined, for separate first and second operating regions thereof, so that the maximum bias force developed by the spring means in the first operating region of the mechanism is substantially at the threshold of the second region and corresponds substantially to the desired meshing force of the driven gear with the drive gear. The threshold of the second region corresponds to engagement of the spring means with the stop. The minimum force developed by the mechanism on the driven gear when the mechanism is operating in its second region is at least ten times greater than the maximum force developed thereby when operating in its first region.

22 Claims, 8 Drawing Figures

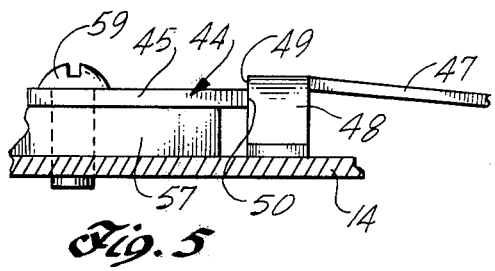 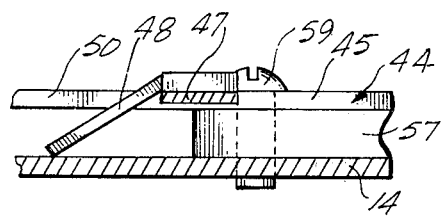
Fig. 5  Fig. 6
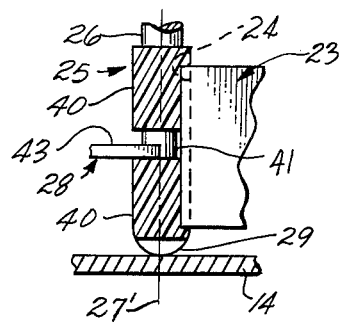
Fig. 7
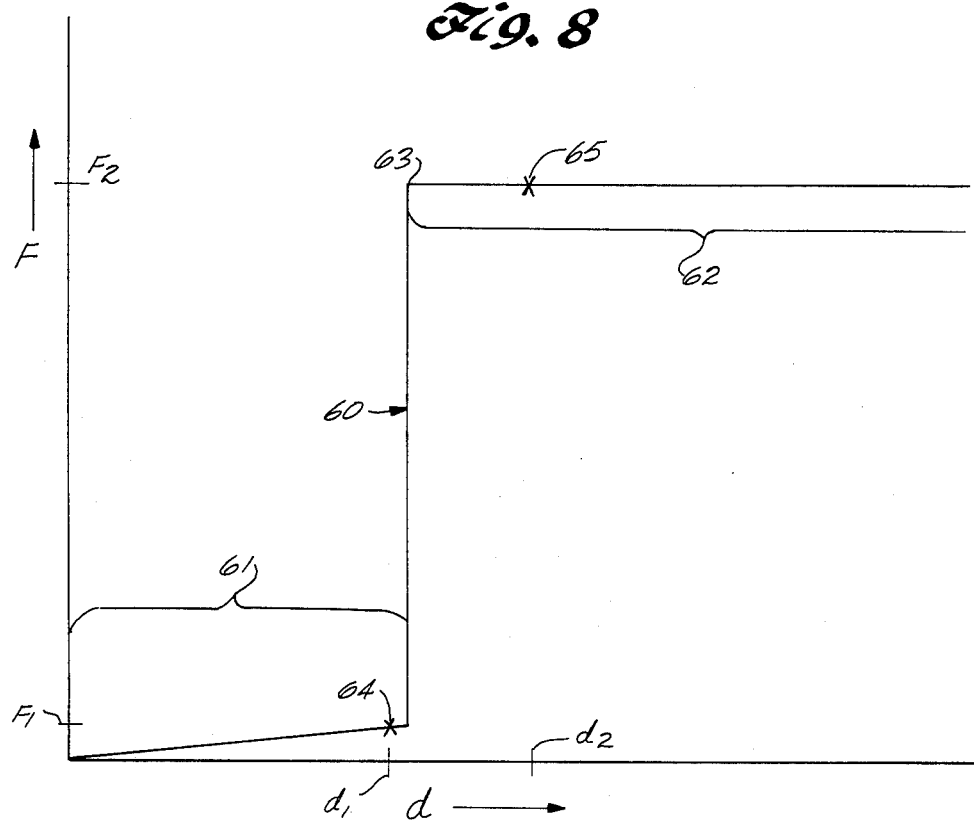
Fig. 8

DUAL RATE BIAS SPRING FOR ANTIBACKLASHING GEARS

CROSS-REFERENCE TO RELATED APPLICATIONS

This application is a continuation-in-part of our prior application Ser. No. 576,883 filed May 12, 1975, and abandoned effective on the filing of this application.

BACKGROUND OF THE INVENTION

This invention pertains to gear trains and to antibacklashing mechanisms therefor; more particularly, it pertains to an improved bias spring for antibacklashing gears, such as floating pinion gears, in variable center distance gear trains.

REVIEW OF THE PRIOR ART

Variable center distance gear trains may be used in one stage or multi-stage gear trains. Such gear trains are often referred to as floating pinion gear trains. Floating pinion gear trains are of the type in which a driven gear, normally smaller in diameter than its drive gear, is rotatable about an axis which, adjacent the drive gear, is not perfectly fixed relative to the axis of the drive gear. Floating pinion gearing arrangements are often used where it is desired to have no backlash in the gear train so that the rotation of the pinion gear exactly follows rotation of the drive gear throughout reversals of motion of the drive gear. In the simplest case, the floating pinion gear train involves the drive gear which is rotatable about a fixed axis, and the pinion gear which normally has its axis of rotation fixed at a location spaced along the pinion axis from the pinion gear by a suitable bearing, but which, at the location of the pinion gear, is movable radially of the drive gear toward and away from the drive gear. The pinion gear shaft has engaged with it a bias spring which urges the pinion gear into antibacklashing intimate mesh with the drive gear.

It will be understood, of course, that the floating pinion concept may also be used in one or more stages of gear trains having two or more stages.

Heretofore the mechanism used in floating pinion gear trains for biasing the pinion gear into antibacklashing mesh with the drive gear has taken the form of a simple spring, either a coil spring or a leaf spring, which applies force to the pinion gear shaft in a direction radially toward the drive gear. In these arrangements, the force applied to the pinion shaft by the spring is substantially greater than the force required to maintain the pinion in antibacklashing mesh with its drive gear under normal operating conditions of the gear train, the applied force is substantially greater than that corresponding to optimum or usual intertooth loading forces under normal operating conditions. The higher level of bias force is required because of considerations of shock or acceleration to prevent the floating pinion gear from jumping out of mesh with its drive gear. Shock or high acceleration may be experienced by an application of shock to the entire mechanism in which the floating pinion gear train is provided, or as a result of sharp changes in the speed or direction of rotation of the input shaft to the gear train. Shocks to the overall mechanism, particularly shocks applied along the line between the drive gear shaft and the pinion gear shaft, may cause the floating pinion gear to move against its bias spring out of mesh with the drive gear. Similarly, since the pressure angle between the drive and driven gear teeth is not zero, sudden changes in the rotational velocity or direction of the drive gear may result in sufficient forces being applied to the pinion gear in a direction away from the axis of the drive gear to cause the driven gear to move out of mesh with the drive gear. Unmeshing of the driven gear from the drive gear may result in stripping of the teeth in the gear train during subsequent operation.

To the extent that the bias force applied to the floating pinion gear is higher than necessary for normal operation conditions of the gear train, the gear train is subject to unnecessary wear and its useful life is reduced.

Prior floating pinion biasing arrangements have sacrificed normal operating conditions in favor of treatment of problems of unmeshing of the driven pinion gear from its drive gear. A need therefore exists for a floating pinion biasing mechanism which under normal circumstances applies to the floating pinion gear only sufficient biasing force toward the drive gear to maintain the desired antibacklashing intimate mesh between the drive and driven gears, and yet which deals successfully with the problem of shock loads to the pinion gear of a character tending to produce unmeshing of the pinion gear from its drive gear.

SUMMARY OF THE INVENTION

This invention provides an improved biasing mechanism for use with variable center distance gear trains, also called floating pinion gear trains, and successfully satisfies the need identified above. The improved bias mechanism applies to the floating pinion gear a force directed radially toward the driven gear which is of optimum value for normal operating conditions of the gear train. The biasing mechanism is arranged so that, in order for the pinion gear to move away from the drive gear a distance sufficient to cause unmeshing of the pinion gear from the drive gear, the biasing mechanism is caused to shift from a first operating region to a second operating region in which the biasing mechanism has a materially higher effective spring force applied to the pinion gear. In other words, the biasing mechanism has a normal-use spring force and spring rate of relatively low value which provides the optimum meshing force of the pinion gear with the drive gear, and a second and materially higher bias force which is brought into effective operation upon the pinion gear before the pinion gear moves sufficiently far in an unmeshing manner away from the drive gear to be fully unmeshed from the drive gear. The present floating pinion biasing mechanism is simple, effective, reliable and economic, and is arranged for precise control of the normal meshing force of the pinion gear with the drive gear.

Briefly summarized, this invention provides an improved biasing mechanism for a driven gear in a gear train of the variable center distance type in which the driven gear is meshed with a drive gear but is mounted for rotation about an axis which, at the location of the driven gear therealong, is not fixed, at least radially, relative to the axis of the drive gear. In this context, the invention provides spring means engageable with the driven gear for biasing the same substantially radially toward the drive gear into mesh therewith with a force corresponding to desired intertooth loading force between the teeth of the drive and driven gears. Stop means are effectively cooperable with the driven gear for limiting movement of the driven gear in a direction radially away from the drive gear to an amount of movement less than the amount required to permit the driven gear to unmesh from the drive gear.

DESCRIPTION OF THE DRAWINGS

The above-mentioned and other features of this invention are more fully set forth in the following detailed description of a presently preferred embodiment of this invention, which description is presented with reference to the accompanying drawings, wherein:

FIG. 5 is an enlarged cross-sectional elevation view taken along line 5—5 in FIG. 3;

FIG. 6 is an enlarged cross-sectional elevation view taken along line 6—6 in FIG. 3;

FIG. 7 is an enlarged fragmentary elevation view of the floating pinion gear as engaged with the drive gear by virtue of the bias mechanism shown in FIGS. 3, 5 and 6; and FIG. 8 is a curve descriptive of the relation of force to deflection of the spring element shown in FIG. 4.

DESCRIPTION OF THE ILLUSTRATED EMBODIMENT

Figure 1:
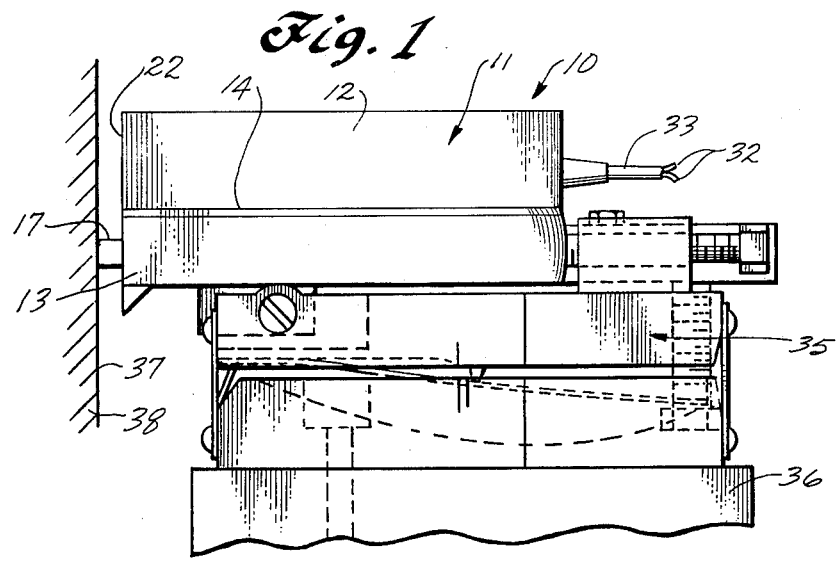
FIG. 1 is an elevation view of a friction wheel measuring device in which the floating pinion biasing mechanism is used.
Figure 2:
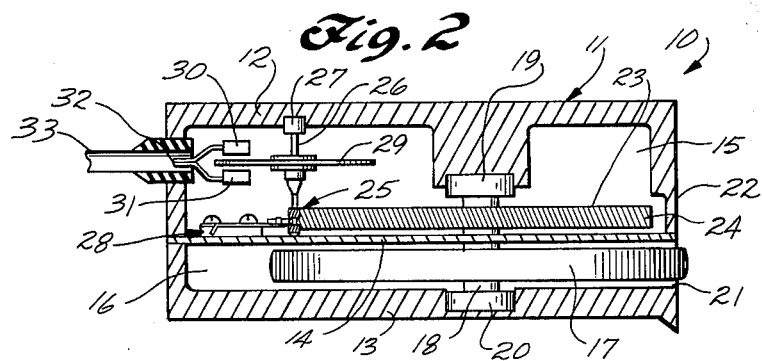
FIG. 2 is a simplified cross-sectional elevation view of the measuring device shown in FIG. 1.

The presently preferred application and utility of this invention is in the context of a friction wheel measuring device 10, as shown in FIG. 1. The measuring device preferably is of the type of which U.S. Pat. Nos. 3,311,985 and 3,378,929 are descriptive. The device includes a housing 11 composed of an upper part 12, a lower part 13, and an intermediate plate 14. The housing defines therein upper and lower chambers 15 and 16; see FIG. 2. A metal metering wheel 17 of precisely predetermined circumferential extent is fixed upon a wheel shaft 18 which is rotatably supported in suitable thrust and journal bearings 19 and 20 within the housing upper and lower parts. The wheel shaft rotates about an axis fixed relative to the housing. The rim of the metering wheel projects through an opening 21 defined by the lower housing part in a front face 22 of the device.

A large diameter drive gear 23, having helical teeth 24 formed in its periphery, is fixed to the wheel shaft in the housing upper chamber to rotate with the metering wheel. A pinion gear assembly 25 is defined on the lower end of a pinion shaft 26 and is meshed with the drive gear in the housing upper chamber toward the rear of the housing. The upper end of the pinion shaft is engaged in a suitable thrust and journal bearing 27 carried by the housing upper part so as to fix the pinion shaft axis 27' (see FIG. 7) relative to the housing at bearing 27. The lower end 29 of the pinion shaft is rounded, as shown best in FIG. 7, to make essentially point contact with the upper surface of the housing intermediate plate 14; there is no journal bearing associated with the lower end of the pinion shaft. Thus, the pinion gear assembly 25 is movable both radially toward and away from the axis of the drive gear and, in the absence of a mechanism so constraining it, the pinion shaft is also movable angularly about the drive gear shaft along the circumference of the drive gear. A biasing mechanism 28 is engaged with the pinion shaft adjacent its lower end for both urging the pinion gear assembly into mesh with the drive gear and for constraining the pinion gear assembly from movement angularly about the drive gear shaft along the periphery of the drive gear.

An optical encoder disc 29 is fixed to the pinion shaft above the pinion gear assembly and cooperates adjacent its periphery between a suitable light source 30 and a suitable photocell arrangement 31 for causing the photocell arrangement to generate a series of electrical pulses in response to rotation of the metering wheel as amplifier at the encoder disc by the gear ratio of the gear train 23, 25. Suitable conductors 32 are connected to the photocell arrangement and the light source by a cable 33 which extend to a measurement display panel (not shown) located remote from measuring device 10 for visually displaying, in appropriate format, measurements made by metering wheel 17. The remote display panel includes a power supply for energizing the light source and appropriate logic circuits for receiving and appropriately processing pulses generated by the photocell arrangement.

In use, measuring device 10 is received in a mounting base and biasing assembly 35 which preferably is in accord with U.S. Pat. No. 3,844,044. The mounting base and biasing assembly is secured to a lathe carriage 36, for example, so that the rim of the metering wheel, which protrudes from the front face of housing 11, is engaged with a measurement surface 37 as defined by a machined surface on a lathe bed 38, for example. The alignment of the measuring device on lathe carriage relative to the measurement surface may be in accord with the description of U.S. Pat. Nos. 3,561,120 and 3,561,121, for example. The bias force applied by mouting base and biasing assembly 35 is such that the periphery of the metering wheel forcefully engages the measurement surface to accurately and faithfully sense travel of the lathe carriage along the lathe bed. Measurements of such travel are presented on the remote display panel with an accuracy of approximately 0.0005 inch for every 6 inches of travel of the metering wheel along the measurement surface.

Measuring devices and measurement systems in accord with the disclosres of the above-mentioned patents are marketed in the United States and elsewhere under the trademark "TRAV-A-DIAL."

In measuring device 10 the gear ratio of the singlestage gear train 23, 25, is 60:1. Accordingly, during normal conditions of use of the measurement device in which the rate of travel of the lathe carriage along the lathe bed is relatively moderate, even when traversing, the angular velocity of the pinion shaft 26 may be substantial. Still, this condition is to be distinguished from the condition which is experienced when the lathe carriage is traversed very rapidly from a standing start along the lathe bed; in this instance, the loads applied to pinion gear assembly 25 by the drive gear teeth, due to the profiles of the teeth on the drive and pinion gears, may be of such magnitude to cause the pinion gear to move in an unmeshing manner radially away from the drive gear. Unmeshing of the pinion gear from the drive gear in measuring device 10 is to be avoided to maintain the required measuremnt accuracy of the device, even through such abnormal operations as high acceleration starts of the lathe carriage along the lathe bed.

As shown best in FIG. 7, the pinion gear assembly 25 preferably is composed of two individual pinion gears 40 spaced closely adjacent ech other on the lower end of the pinion shaft above and below a reduced diameter land section 41 with which biasing mechanism 28 is engaged. Pinion gears 40 are helically toothed to mesh with the helical teeh 24 defined on the periphery of the drive gear. The pinion gear shaft is engaged in a notch 42 formed in a bias end 43 of a unitary spring element 44 which is a major component of the pinion biasing mechanism and which is shown in greater detail in FIG. 4 in its undeflected state.

Figure 4:
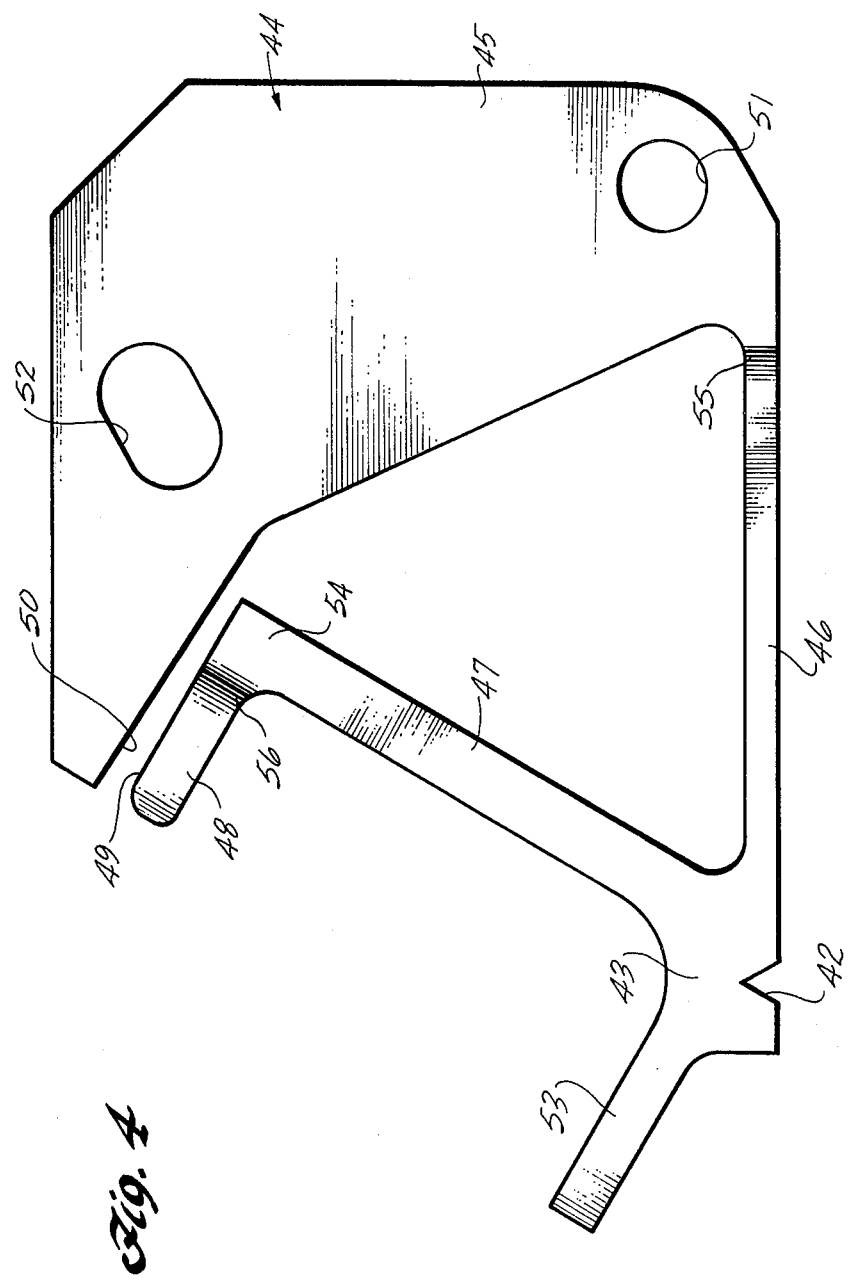
FIG. 4 is an enlarged plan view of the spring element of the biasing mechanism as manufactured.

The spring element 44 preferably is formed as illustrated in FIG. 4 by stamping the same from a sheet of 0.012 inch thick beryllium copper. The spring element has respective portions defining a base 45, a leaf spring 46, (also referred to as a flexure arm) and a column 47 (also referred to as a stop projection). The leaf spring flexure arm extends in cantilever fashion from one end of the base to the bias end of the element where it is connected to one end of the column; the general area of the intersection between the leaf spring and the column is the bias end of the bias spring. The notch 42 if formed in the bias end of the spring element to open away from the column close to the point of intersection of the longitudinal center lines of the leaf spring and the column. The leaft spring is laterally deflectable in the plane of the flexure arm as shown in FIG. 4. The column is disposed in the spring element so that its elongate extent is aligned substantially parallel to the arc along which notch 42 moves as the leaf spring flexure arm is deflected. Thus, the force applied by the spring element to the pinion shaft due to deflection of the flexure arm is applied substantially radially of the drive gear.

A finger 48 extends laterally from the columnar stop projection at the end thereof remote from the leaf spring. The finger has a stop edge 49 which, in the relaxed condition of the spring element, is spaced from a stop edge 50 defined by the base of the spring element. A first circular mounting hole 51 is formed through the base adjacent the intersection of the leaf spring flexure arm with the base, and a second slot mounting hole 52 is formed through the base adjacent the end of the column from which the stop finger extends. Slot opening 52 has its length aligned along an arc about the center of circular opening 51. As initially stamped, a lug 53 is defined by the spring element to extend from the bias end of the flexure arm substantially prpendicular to the elongate extent of the column and generally away from the flexure arm.

The leaf spring flexure arm has a width, i.e., dimension in the basic plane of the spring element transverse to the elongate extent of the arm, and a length which are selected so that, when the arm is deflected in the plane of the spring element to cause stop edge 49 to approach stop edge 50, the desired normal-use bias force of the pinion gear 40 into mesh with the drive gear teeth 24 is developed by the spring element at notch 42 just as the stop edges first contact each other.

As shown best in FIG. 4, the spring element is bent during manufacture thereof, as at 55 at the base of the flexure arm near the base of the element, so that the bias end 43 of the arm lies below the plane of the base to react down on lower pinion 40 for axial positioning of the pinion shaft against plate 14 (see FIG. 7). The spring element is also bent, as at 56 at the root of the finger, so that the free end of the finger engages plate 14 sufficiently to place the rear end of the columnar stop projection slightly above base 45 sto that stop edge 49 traverses the stop edge 50 defined by the base of the spring element. These relationships are shown in FIGS. 5 and 6.

As shown in FIGS. 2, 3, 5 and 6, a mounting block 57 and two screws 58 and 59 are used to mount the spring element to the upper surface of the housing intermediate plate to the rear of the drive gear in the housing upper chamber 15, the mounting block being disposed between the housing intermediate plate and the base of the spring element. Circular mounting hole 51 is sized to cooperate closely with the threaded shank of mounting screw 58 which is first passed through the hole and threaded into the mounting block and the housing intermediate plate to serve as a fulcrum about which the base of the spring element may be pivoted in adjusting the spring element. The position of the spring element about screw 58 is adjusted to produce that deflection of the leaf spring flexure arm which causes the desired meshing force to be developed by the spring at its bias end and to be applied radially of the drive gear to the pinion shaft as described above. The base of the spring element is pivoted counterclockwise about mounting screw 58 in making this adjustment until, as preferred, stop edges 49 and 50 of the spring element just move into contact or until the stop edges are spaced from each other by a distance which corresponds to deflection of the bias end of the flexure arm away from the pinion shaft by an amount which is less than, preferably much less than, the amount by which the bias end of the flexure arm must deflect to permit the pinion gears 40 to unmesh from drive gear 23. The mounting screw 59, which cooperates with the slot opening in the spring element, is then tightened to secure the spring element and the mounting block to the housing intermediate plate. During this adjustment process, the bias end of the flexure arm remains stationary by virtue of its engagement with the pinion shaft and the engagement of the pinion gears with the drive gear.

Figure 3:
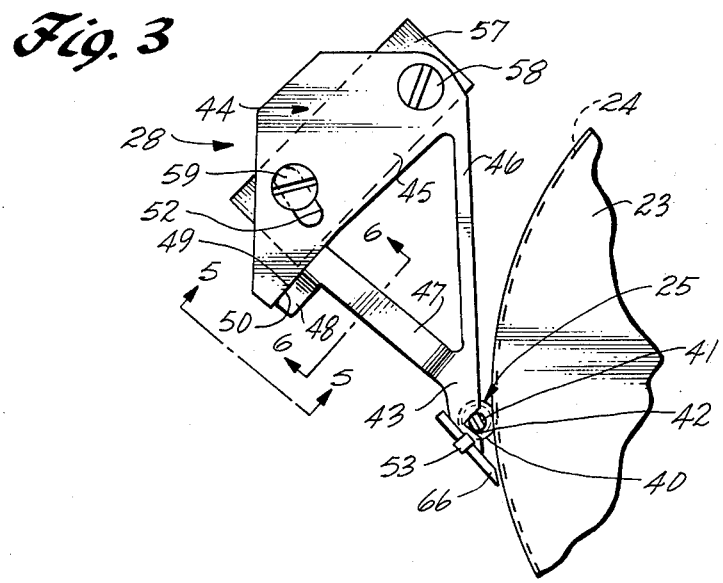
FIG. 3 is an enlarged fragmentary top plan view of the floating pinion biasing mechanism as adjusted in use.

From an examination of FIG. 3, it will be apparent that the cooperation of the spring element notch with the pinion gear shaft fixes the pinion shaft axis from movement along the circumference of the drive gear. The pinion gears can move out of mesh with drive gear teeth only if the bias end of flexure arm is permitted to move radially away from the drive gear. Such unmeshing deflection of the bias end of the arm is prevented by operation of the stop defined by stop edges 49 and 50. Column 47 is then essentially end-loaded with a small degree of eccentricity and must deflect as a column to accommodate such unmeshing deflection of the bias end of the flexure arm. The length and cross-sectional configuration of the column is defined so that the amount of force which must be applied to he flexure arm at its bias end by the pinion shaft to product unmeshing deflection of the column is at least ten times greater than the force which is developed by the leaf spring when stop edges 49, 50 are abutted. In the presently preferred arrangement illustrated in the accompanying drawings, the force which must be applied to the flexure arm at its bias end to produce unmeshing deflection of the column is approximately 500 times greater than the force required to deflect the leaf spring sufficiently to cause abutment of stop edges 49 and 50. In effect, the column, as compared to the flexure arm, functions as a rigid stop preventing unmeshing of the gears.

From the foregoing description, it will be apparent that the biasing mechanism is arranged so that in use its curve 60 of force versus deflection (see FIG. 8) has two operative regions 61 and 62. In its first operating region 61, beginning with the origin of curve 60 (corresponding to the undeflected state of the spring element) and extending to substantially the threshold 63 of the second operating region 62, the spring rate of the spring element (i.e., of the flexure arm) is linear and of relatively low value. The first region corresponds to deflection of the leaf spring flexure arm only; the second region corresponds to deflection of the leaf spring flexure arm and of the columnar stop projection, but the contribution of the flexure arm to the total force developed by the spring element at its bias end is nominal. The maximum force $F_1$ capable of being developed by the flexure arm at its bias end due to deflection only of the arm is substantially less (at least ten times less and preferably on the order of 500 times less) than the minimum force developed by the spring element when operating in its second region. Since operation of the spring element in its second region corresponds principally to deflection of the column, the spring rate of the spring element in its second region is substantially constant, i.e., zero, but at a force $F_2$ which is at least one order of magnitude greater than $F_1$.

In FIG. 8, the locations 64 and 65 on curve 60 represent two separate deflection states $d_1$ and $d_2$ of the spring element. Deflection state $d_1$ corresponds to the deflection of the spring element when it is adjusted to produce the desired meshing force of the pinion gear assembly with the drive gear in the manner described above. Preferably, deflection state $d_1$ corresponds essentially to the maximum force capable of being developed by the spring element when opeating in is first region. The difference in deflection of the spring element represented by the horizontal distance in FIG. 8 between deflection states $d_1$ and i $d_2$ corresponds to movement of the bias end of the flexure arm required to enable the pinion gears to move out of mesh with the drive gear. FIG. 8 shows that the normal operating condition of the spring element is adjusted so that, if the bias end of the flexure arm is moved radially away from the drive gea by an amount sufficient to enable unmeshing of the pinion gear from the drive gear (i.e., $d_2$-$d_1$), the spring element is caused to be operative in its second region well before the pinion gear has moved sufficiently away from the drive gear to actually become unmeshed therefrom. It follows, therefore, that biasing mechanism 28 provides a relatively low bias force upon the floating pinion gears to urge them into intimate backlashing mesh with the drive gear during normal operation of the gear train, and yet the biasing mechanism is essentially rigid in terms of shock or acceleration loads applied to the pinion gear of a type tending to produce unmeshing of the pinion gear from the drive gear. Because the biasing mechanism is essentially rigid to unmeshing loads applied to the pinion gear, the biasing force $F_1$ applied to the pinion gear during normal conditions of operation may be selected at the optimum meshing force.

As shown in FIG. 3, lug 53 of the spring element is, during manufacture of he biasing mechanism, bent over to serve as a holder for a length of lubricant wick material 65 which is impregnated with a suitable lubricant to lubricate the drive and pinion gears during operation of measuring device 10. A piece of balsa wood has been found to be a useful wick material for this purpose.

As summarized above, this invention, in its broad aspects, provides a biasing mechanism which has a low force, low rate spring for biasing the floating driven gear into msh with the drive gear with a force which is defined at a level corresponding to normal operating conditions; contrast this aspect of the invention with prior practice in which the bias force was defined at a much higher level because of considerations of shock unmeshing rather than normal use considerations. Also, the mechanism provides a stop for effectively limiting movement of the driven gear in an unmeshing manner away from the drive gear to an amount of movement which is insufficient to enable unmeshing. In the preferred embodiment of the invention described and shown, the low-force bias and stop features are provided by the spring element itself, but it is within the scope of this invention that the stop feature may be defined by structure other than or in addition to the geometry of the spring element.

For example, the stop which limits unmeshing motion of the driven gear away from the drive gear may be provided by a stop element cooperable directly with the pinion gear shaft. The stop element could be placed closely adjacent the pinion shaft 26 above pinion gears 40, and spaced from the shaft during normal conditions by an amount less than the amount of travel needed, at that point along the pinion shaft, to cause the pinion gears to move out of mesh with drive gear 23. Alternatively, the stop element could cooperate with any selected portion of flexure arm 46 to limit deflection of the arm, as encountered at notch 42, in a direction away from the pinion shaft to an amount less than the deflection required to enable the driven and drive gears to unmesh from each other. In either case, the stop element would be fixed relative to the adjacent fixed structure in which the gear train is mounted.

The biasing mechanism described above, in which high and low bias spring forces and the stop function (corresponding to the high bias spring force) are combined in a single spring element, is believed to be a particularly effective and efficient embodiment of the many forms in which this invention may appear.

From the foregoing description and the accompaying illustrations, it will be apparent that in biasing mechanism 28 the flexure arm 46 is disposed to flex or deflect in a plane which is substantially normal to the plane in which the axes of gears 23 and 25 are disposed, and the flexure arm effectively extends along a line normal to such gear axis plane. The stop projection defined by column 47 extends from the flexure arm substantially in the plane of the flexure arm and along a line substantially parallel to the plane of the gear axes.

The foregoing description has been presented with reference to a presently preferred embodiment of this invention. In this embodiment, gear 25 is smaller than gear 23, and for this reason gear 25 has been referred to as a pinion gear. It will be recognized that this invention can be used where the smaller of two meshed gears is a driving gear and the larger gear is a driven gear. Similarly, a variable center distance gear train need not have the smaller of two meshed gears rotatable about a variable axis; the larger gear can have a variable axis of rotation and the smaller gear can be rotatable about either a fixed axis or a variable axis. Thus, this invention is useful with any variable axis gear in a variable center distance gear train regardless of whether the train is for motion amplification (as described above) or for motion reduction. In the context of this invention, including in the interpretation of the following claims, a variable center distance gear train is one in which a drive gear and a driven gear are meshed for rotation about respective axes, and the axis of at least one of the meshed gears, at least adjacent the location of mesh between the gears, is not fixed in position relative to the axis of rotation of the other gear.

It will be apparent from the foregoing description that this invention efficiently, simply, economically and reliably solves the problem heretofore encountered in bias springs for floating pinion gear trains. Workers skilled in the art to which this invention pertains will appreciate that the principles and teachings of this invention, as set forth above, may be adapted to floating pinion gear trains for applications other than measuring devices or the like. Specific biasing mechanisms in accord with the teachings of this invention may differ in appearance from the presently preferred biasing mechanism described above. Workers skilled in the art will appreciate that this invention has been described above in the context of the presently preferred embodiment, in a presently preferred use thereof, and that changes, modifications and alterations may be made in the above-described structure without departing from the fair scope of this invention.

What is claimed is:

1. In a gear train having a drive gear and a driven gear meshed with the drive gear and mounted for rotation about an axis which is not fixed at least radially relative to the axis of the drive gear, the improvement in means for biasing the driven gear into mesh with the drive gear comprising spring means engaged with the driven gear for biasing the same substantially radially toward the drive gear into mesh therewith, the spring means having first and second spring rates defined for separate first and second operating regions thereof so tha the maximum bias force developed thereby in its first region is substantially at the threshold of the second region and corresponds substantially to a desired meshing force of the driven gear with the drive gear, the minimum force developed by the spring means operating in its second region being at least 10 times greater than the force developed thereby operating in its first region.

2. Apparatus according to claim 1 wherein the axis of the driven gear is not fixed angularly relative to the axis of the drive gear, and the spring cooperates with the drive gear for holding the axis thereof fixed angularly relative to he drive gear axis.

3. Apparatus according to claim 1 wherein the spring rate of the spring means in its second region is substantially zero.

4. Apparatus according to claim 1 wherein the deflection of the spring means at the driven gear corresponding to the force difference developed by the spring means between said desired meshing force and the force associated with the threshhold of the second region is less than the amount of movement of the driven gear away from the drive gear productive of unmeshing of the gears.

5. Apparatus according to claim 1 including means for adjusting the deflection state of the spring means to a condition in which the bias force developed by the spring means on the driven gear is essentially the maximum force developed in the first region and in which movement of the driven gear away from the drive gear sufficient to produce unmeshing of the gears causes the spring means to be operative in its second region above the threshhold thereof.

6. Apparatus according to claim 1 wherein the minimum force developed by the spring means operating in its second region is on the order of 500 times the maximum force developed thereby operating in its first region.

7. Apparatus according to claim 1 wherein the force developed by the spring means when deflected sufficiently to enable unmeshing of the gears is on the order of 500 times the desired meshing force.

8. Apparatus according to claim 1 wherein the spring means defines a laterally deflectable leaf spring mounted at one end thereof to a base in cantilever fashion and engageable with the driven gear adjacent its other end, a column spring disposed substantially in the deflection plane of the leaf spring and connected at one end thereof to the leaf spring adjacent the other end of the leaf spring, and stop means for abutting the other end of the column spring and from which the other end of the column is spaced in the relaxed state of the spring means, the column spring being related to the leaf spring to be substantially end-loaded by the driven gear when the other end thereof abuts the stop means.

9. Apparatus according to claim 8 wherein the force required to deflect the leaf spring sufficiently to cause the column spring to abut the stop means is substantially equal to the desired meshing force, and the force required to produce buckling of the column spring is at least 10 times greater than the desired meshing force.

10. Apparatus according to claim 9 wherein the column spring is aligned substantially parallel to the line along which the other end of the leaf spring moves during deflection thereof.

11. Apparatus according to claim 8 wherein the first region of the spring means corresponds to deflection only of the leaf spring up to the point of contact of the column spring with the stop means; and the second region corresponds to deflection of the column spring.

12. Apparatus according to claim 1 wherein the spring means defines a spring portion engaged with the driven gear for biasing the latter and the deflection of which corresponds to the first region of the spring means, and resilient means coupled to the spring portion adjacent the location of engagement of the spring portion with the driven gear to be sensitive in terms of its own deflection to movement of the driven gear away from the drive gear, and including stop means with which the resilient means is engagable for loading of the resilient means but from which the resilient means is spaced in the relaxed state of the spring means and toward which the resilient means moves during deflection of the spring portion, deflection of the resilient means corresponding to the second region of the spring means, the spring portion and the resilient means being cooperatively defined and related in the spring means so that the spacing between the resilient means and the stop means, when the spring portion is deflected to impose on the driven gear the desired meshing force, is less than the distance through which the resilient means must move to accommodate unmeshing of the driven gear from the drive gear, and so that the force developed by the resilient means by deflection thereof in response to unmeshing movement of the driven gear is at least 10 times greater than the desired meshing force before the driven gear can move sufficiently to unmesh from the drive gear.

13. Apparatus according to claim 12 wherein the resilient means is a column spring disposed to be end-loaded upon engagement of one end thereof with the stop means.

14. Apparatus according to claim 12 wherein the stop means is defined by the spring means.

15. A biasing mechanism for variable center distance gear trains in which a driven gear is engagable with a drive gear and is rotatable about an axis which, at least adjacent the drive gear, is not fixed in position radially of the drive gear, the mechanism comprising spring means engageable with the driven gear for biasing the driven gear substantially radially toward the drive gear into mesh therewith with a force corresponding to a desired intertooth loading force between the teeth of the drive and driven gears during conditions of substantially normal use, and stop means effectively cooperable with the driven gear for limiting movement of the driven gear in a direction radially away from the drive gear to an amount of movement less than the amount required to permit the driven gear to unmesh from the drive gear.

16. A biasing mechanism according to claim 15 wherein the stop means is cooperable with the spring means for limiting deflection of the spring means at the location thereof with the driven gear in a direction radially away from the drive gear.

17. A biasing mechanism according to claim 16 wherein the spring means is of the leaf type including a flexure arm engageable at a location therealong with the driven gear, and wherein the stop means includes a projection extending from the flexure arm for abutment with a stop surface.

18. A biasing mechanism according to claim 17 wherein the projection extends from the flexure arm proximately adjacent said location.

19. A biasing mechanism according to claim 17 wherein the projection defines a column spring hving a threshold buckling force at least ten times greater than the deflection force of the flexure arm at the instant of contact of the projection with the stop surface.

20. A biasing mechanism according to claim 17 wherein the spring means includes a base portion from which the flexure arm extends, and the base portion defines the stop surface.

21. A biasing mechanism according to claim 17 wherein the flexure arm is adapted to be disposed in a plane substantially normal to the axes of the drive and driven gears with the flexure arm extending effectively along a line substantially normal to a plane common to the axes of the drive and driven gears.

22. A biasing mechanism according to claim 21 wherein the projection extends fromthe flexure arm substantially in the plane thereof along a line substantially parallel to a plane common to the axes of the drive and driven gears.

* * * * *

UNITED STATES PATENT AND TRADEMARK OFFICE
CERTIFICATE OF CORRECTION

PATENT NO. : 4,047,447
DATED : September 13, 1977
INVENTOR(S) : Irven H. Culver, Oleg Szymber It is certified that error appears in the above-identified patent and that said Letters Patent are hereby corrected as shown below:

Column 4, line 12, for "amplifier" read -- amplified --; line 15, for "extend" read -- extends --; lines 34,35, for "mouting" read -- mounting --; line 44, for "disclosres" read -- disclosures --. line 63, for "measuremnt" read -- measurement --; line 68, for "ech" read -- each --. Column 5, line 4, for "teeh" read -- teeth --; line 24, for "leaft" read -- leaf --; line 46, for "prpendicular" read -- perpendicular --. Column 6, line 52, for "he" read -- the --; line 53, for "product" read -- produce --. Column 7, line 31, for "opeating" read -- operating --; line 34, delete "i"; line 39, for "gea" read -- gear --; line 68, for "msh" read -- mesh --. Column 9, line 33, for "tha" read -- that --. Column 10, line 44, for "engagable" read -- engageable --. Column 11, line 2, for "engagable" read -- engageable --. Column 12, line 7, for "hving" read -- having --; line 22, for "fromthe" read -- from the --.

Signed and Sealed this

Eighteenth Day of April 1978

[SEAL]

Attest:

RUTH C. MASON
Attesting Officer

LUTRELLE F. PARKER
Acting Commissioner of Patents and Trademarks